Oct. 27, 1970
E. W. HOWE
3,537,059
ELECTRICAL CONNECTION MEANS SUITABLE FOR USE BETWEEN
TWO RELATIVELY MOVING BODIES
Filed July 5, 1968
3 Sheets-Sheet 1
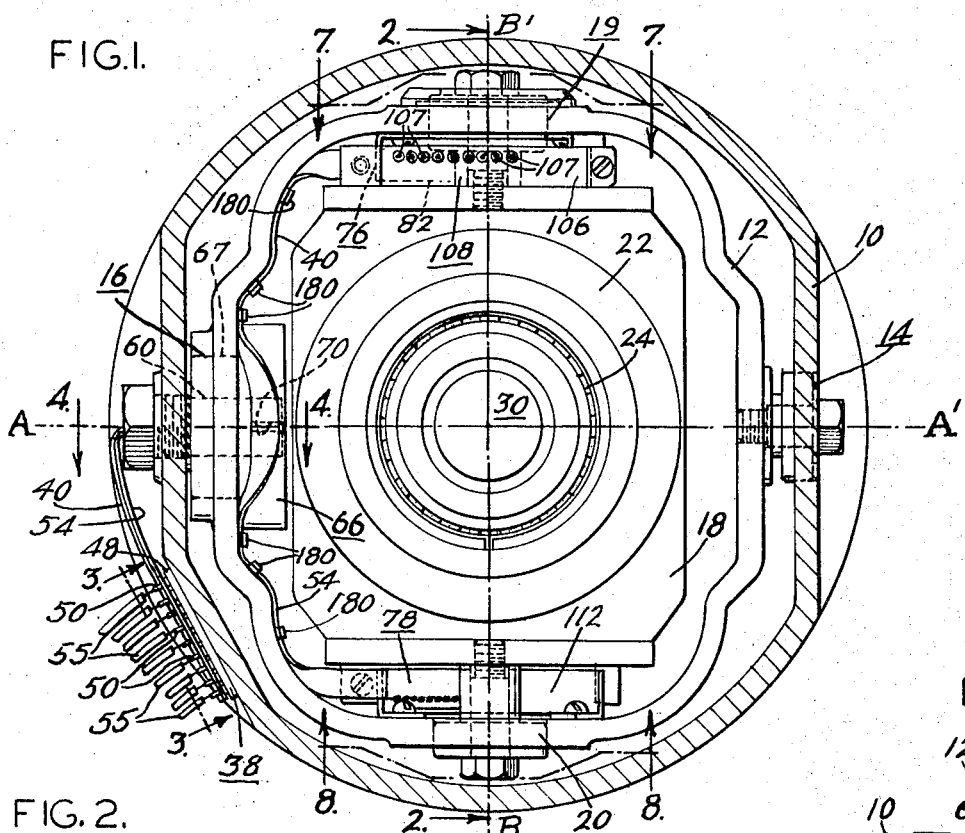
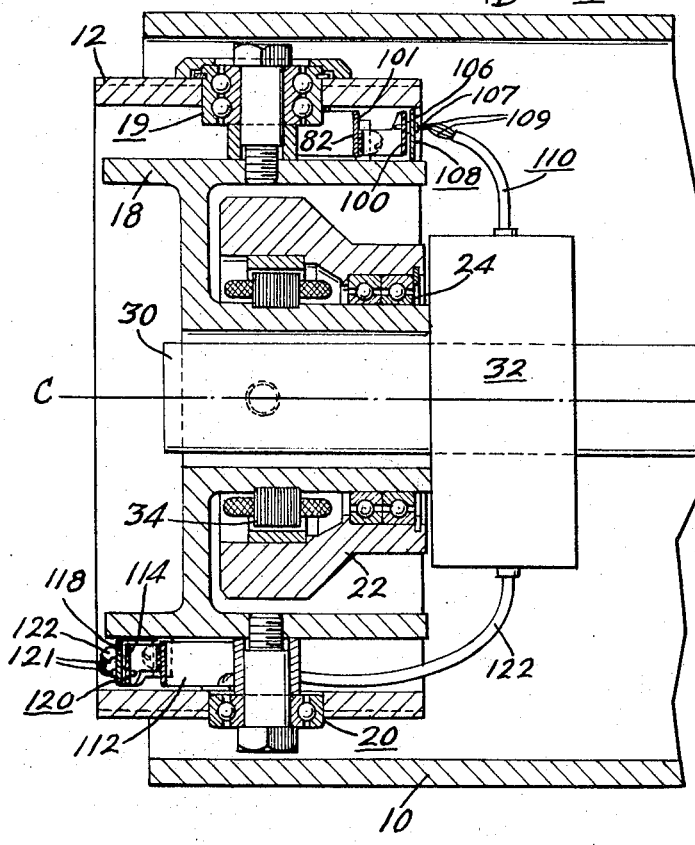
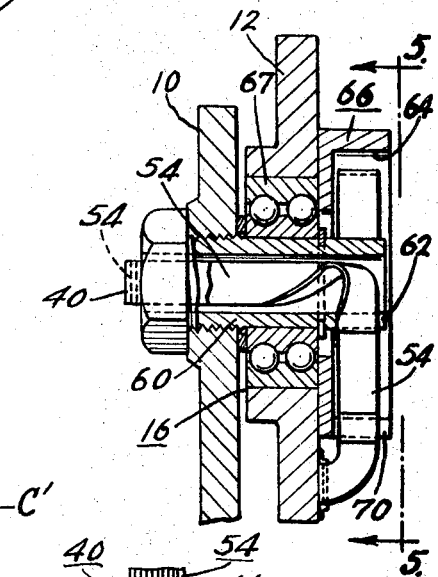
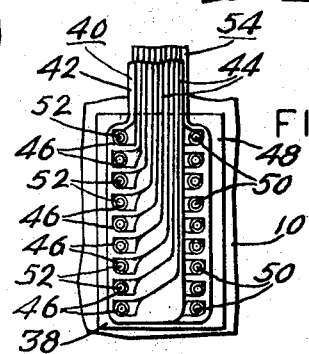
INVENTOR:
EDWIN W. HOWE
BY
Howson & Howson
ATTYS

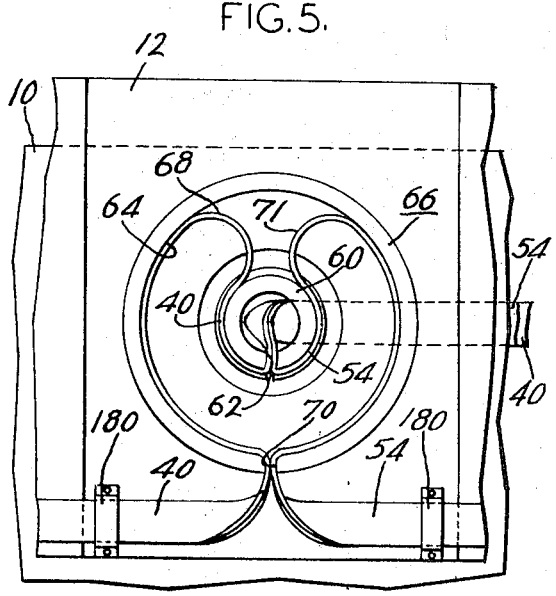
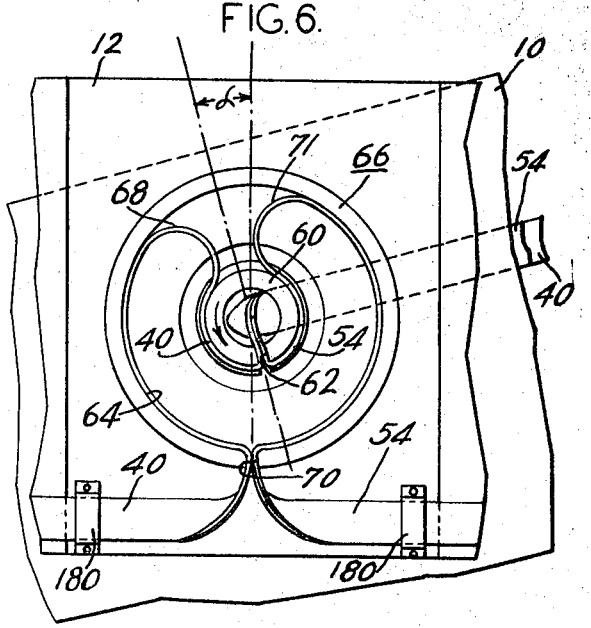
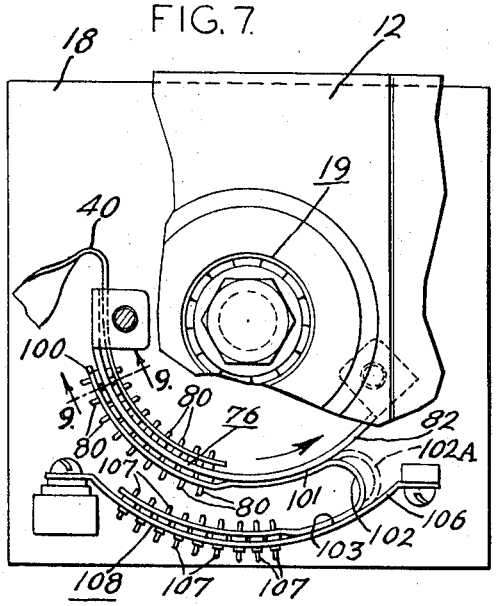
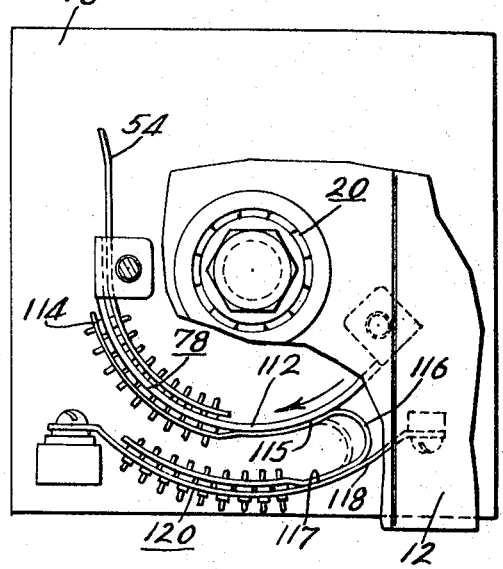
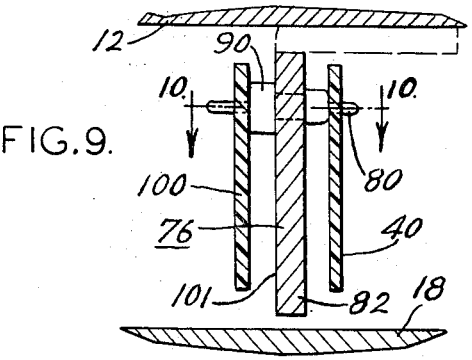
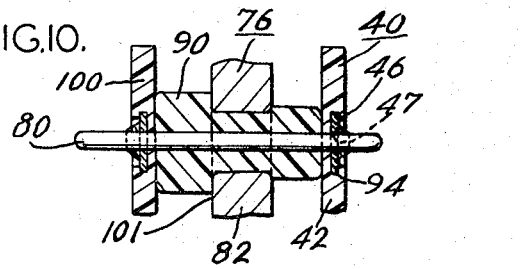

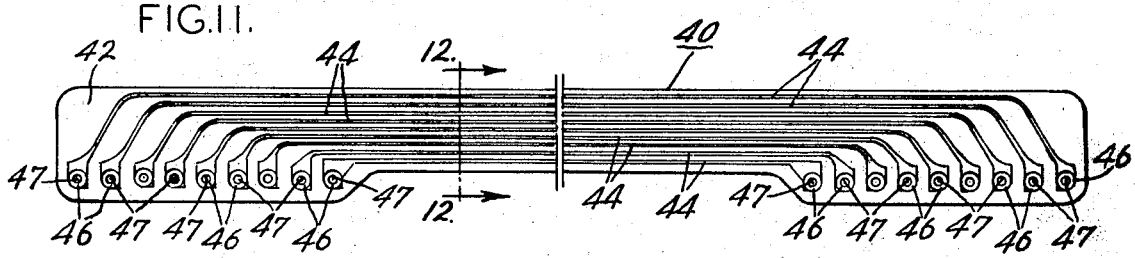
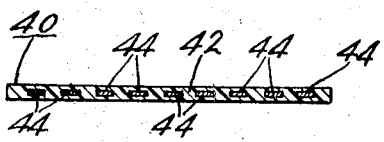
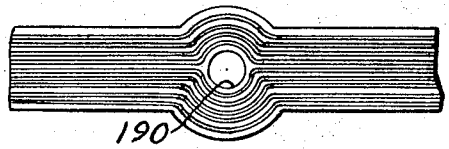
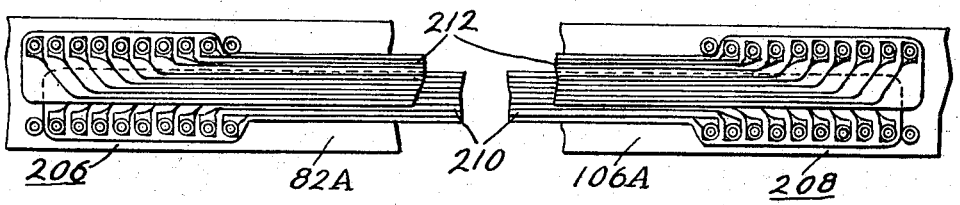
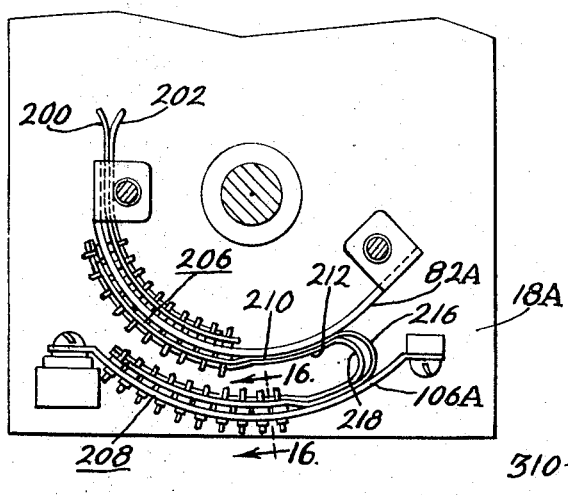
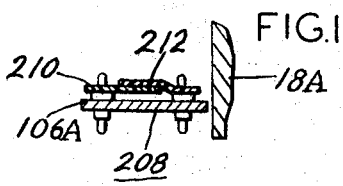
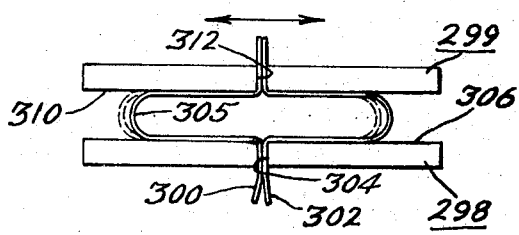

United States Patent Office 3,537,059
Patented Oct. 27, 1970

3,537,059
ELECTRICAL CONNECTION MEANS SUITABLE FOR USE BETWEEN TWO RELATIVELY MOVING BODIES
Edwin W. Howe, North Baldwin, N.Y., assignor to AMBAC Industries, Incorporated, Garden City, N.Y., a corporation of New York
Filed July 5, 1968, Ser. No. 742,566
Int. Cl. H01r 39/02
U.S. Cl. 339—8                                   9 Claims

ABSTRACT OF THE DISCLOSURE

Electrical connection between two relatively rotatable bodies is provided by a flexible plastic tape having filamentary electrical conductors embedded therein and extending from one end to the other. One end of the tape is fastened to one of the bodies and the other end of the tape is fastened to the other of the bodies. The intermediate portion of the tape lies along coaxial confronting surfaces on the two relatively rotatable bodies and extends between the bodies in the form of a compressed resilient half-loop so that relative rotation of said bodies causes the tape to be peeled off one of said surfaces and laid down on the other, whereby substantially no friction or spring restraint is produced to oppose the relative rotation. Any small torque effect remaining is preferably compensated by utilizing a similar type member extending in the opposite sense around the axis of rotation to cancel any remanent torque produced by the first tape member. The apparatus is particularly useful for providing electrical connections across pivots in gyroscopes.

BACKGROUND OF THE INVENTION

This invention relates to apparatus for providing electrical connection between two relatively movable bodies, and particularly to apparatus for providing electrical interconnection between a gimbal of a gyroscope and another body, which is relatively rotatable with respect to the gimbal, such as another gimbal or a housing.

There are a variety of applications in which it is desirable to provide electrical connection between two relatively movable bodies. This can be done, for example, by use of flexible wires, by slip rings or by various forms of sliding contacts or solid-to-liquid contacts.

One particular application of such electrical connection apparatus occurs in a gyroscope in which it is desired to provide electrical connection between an inner gimbal and an outer gimbal, or between an outer gimbal and a housing, for example, the electrical connection effectively bridging a pivot or other type of bearing support. In such apparatus it is important to reduce the friction and spring restraint introduced by the electrical interconnection means, since otherwise an error in operation will be introduced. While there are known forms of apparatus which may be used for this purpose, for example low-friction slip rings, the costs of their incorporation into such equipment is generally quite high and/or their effectiveness relatively low.

Accordingly it is an object of the invention to provide new and useful apparatus for providing electrical connection between two relatively moving bodies.

Another object is to provide such electrical connection apparatus in which friction and spring restraint introduced by the connection apparatus is very small.

Another object is to provide such apparatus which is inexpensive and simple to install.

SUMMARY OF THE INVENTION

These and other objects of the invention are achieved by the provision of a flexible member, preferably of tape-like form, which extends between the two relatively movable bodies and has a first portion fixed to a point on the first of the two bodies and a second portion fixed at a second point on a second body, the intermediate portion of the flexible member between said first and second portions thereof including an electrically-conductive material which extends between said first and second portions. The first and second bodies are provided with respective first and second confronting surfaces substantially parallel to each other and arranged so that said first and second surfaces move parallel to each other upon relative movement of the first and second bodies. The intermediate portion of the flexible member extends between the first and second surfaces in an open resilient loop held under compression by the first and second surfaces, and also extends freely along, and in contact with, the parts of the first and second surfaces adjacent the opposite ends of the loop. The arrangement is such that when the relatively movable bodies execute their motion, the flexible member is peeled off one of the parallel surfaces and laid down in a corresponding amount on the other. There is no sliding motion of the flexible member with respect to the surfaces, and hence no friction. Also, substantially the entire force exerted by the compressed loop is normal to the surfaces of the bodies and substantially constant. In applications in which the first and second bodies are to be rotated with respect to each other the first and second surfaces are coaxial about the axis of rotation and the curvature imposed on the flexible member by the curved surfaces produces a small remanent torque acting between the two bodies; in accordance with another feature of the invention, this torque is preferably substantially cancelled by utilizing another flexible member arranged in the opposite sense to the first-mentioned flexible member with respect to the axis of rotation, so that the remanent torque exerted thereby equals and balances out that due to the first flexible member.

In a preferred form, the flexible members are plastic tapes each having a plurality of filamentary electrical connectors printed thereon or embedded therein. In some cases the two rotationally-opposed tapes are displaced from each other along the axis of rotation, while in other cases the two tapes are at the same position along the axis.

BRIEF DESCRIPTION OF FIGURES

These and other objects and features of the invention will be more readily understood from a consideration of the following detailed description, taken in connection with the accompanying drawings, in which:

FIG. 1 is a vertical section showing equipment embodying one preferred form of the invention to provide electrical interconnections in a gyroscope system;

FIG. 2 is a sectional view taken along lines 2—2 of FIG. 1;

FIG. 3 is a view taken along lines 3—3 of FIG. 1;

FIG. 4 is a sectional view taken along lines 4—4 of FIG. 1;

FIG. 5 is a view taken along lines 5—5 of FIG. 4 with the parts thereof in one relative rotational position;

FIG. 6 is a view like that of FIG. 5, showing the same parts in a different relative rotational position;

FIG. 7 is a view taken along lines 7—7 of FIG. 1;

FIG. 8 is a view taken along lines 8—8 of FIG. 1;

FIG. 9 is a fragmentary enlarged sectional view taken along lines 9—9 of FIG. 7;

FIG. 10 is an enlarged fragmentary sectional view taken along lines 10—10 of FIG. 9;

FIG. 11 is a plan view of a tape member utilized in one preferred embodiment of the invention;

FIG. 12 is a sectional view taken along lines 12—12 of FIG. 11;

FIG. 13 is a plan view of one type of tape connector utilizable in the invention;

FIG. 14 is a plan view showing an arrangement of plural flexible tapes one above the other in one preferred arrangement of the invention;

FIG. 15 illustrates a form of the invention utilizing two tapes one above the other and in contact with each other;

FIG. 16 is a section taken along lines 16—16 of FIG. 15; and

FIG. 17 is a schematic elevational view showing how the invention may be applied to accommodate linear relative motion.

DETAILED DESCRIPTION OF PREFERRED EMBODIMENTS

Referring now to the particular embodiment of the invention shown by way of example only in the figures, FIG. 1 shows a gyroscope system comprising an outer supporting frame 10 adapted to fit within a generally cylindrical closure or housing. Inside frame 10 is mounted an outer gimbal 12, which is supported on frame 10 by means of bearings 14 and 16 for rotation about a horizontal axis AA'. Inner gimbal 18 is mounted inside the outer gimbal for rotation with respect thereto about a vertical axis BB', by means of bearings 19 and 20. The inner gimbal 18 supports a gyro rotor 22 on a suitable bearing 24 for rotation about a spin axis CC' in the inner gimbal. Any appropriate electrical equipment 30, such as a television camera tube for example, may be mounted on inner gimbal 18 and operated from electrical control circuitry unit 32. Electrical control circuitry unit 32 may provide the power to operate the camera tube and to drive the spin motor 34, and also may receive signal indications, such as image-representing signals from the camera tube and/or rotor angle-indicating pickoff signals from pickoff devices (not shown) adjacent the rotor. In any event, the arrangement shown is assumed to be one in which it is necessary to provide a plurality of electrical connections between equipment mounted on the inner gimbal 18 and a terminal strip 38 secured to the exterior of the frame 10.

In the present example the desired electrical connections between the terminal strip 38 on frame 10 and the control circuitry unit 32 on the inner gimbal 18 is provided by means of flexible tapes of the general type illustrated in FIGS. 11 and 12. Thus one tape 40 comprises a flexible tape body 42 having embedded therein a plurality of filamentary electrical connectors such as 44 extending between opposite end portions thereof. While such tapes are well known for other purposes and may be fabricated in a variety of ways, by way of example only such a tape may be formed by first providing a plastic electrically-insulating flexible tape body 42 having the shape illustrated in FIG. 11, coating the tape with an electrical conductor such as copper, removing the copper except in the positions of the connectors 44 by conventional photoengraving or photoresist etching procedures, and then providing another coating of the same plastic material over and between the copper strips. In the example illustrated in FIG. 11, each end of the tape 40 is enlarged in width so that each electrical connector terminates at a different electrical terminal point such as 46, these terminal points being disposed along the edge, and parallel to the length, of the tape 40. Each terminal point contains a hole such as 47 extending through the entire tape for receiving a contact pin. In order to expose the electrically conductive material in the tape for purposes of making contact thereto, the plastic material may be removed at each terminal point by abrasion or in any other convenient manner. In one embodiment the tape body 42 was made of a commercial plastic material manufactured by E. I. du Pont de Nemours & Company under the trade name Kapton, which is a polyimide film. Typically the tape may be ½ inch in width at its ends, ⅜ inch in width between the enlarged ends, and about three or four mils thick.

Terminal strip 38 comprises as electrically insulating terminal panel 48 (see FIG. 3) mounted in any convenient manner on frame 10 and provided with two parallel rows of contact pins such as 50 and 52, each positioned and spaced so that the holes in the terminal end of one of the tapes can be registered with one row of the contact pins, the contact pins slipping through the corresponding holes and being soldered thereto in any convenient way. Thus the individual connectors 46 of tape 40 make contact with the set of pins 52, while the tape 54 provides contact with the other set of pins 50. It will be understood that flexible leads such as 55 may also be electrically connected to the contact pins 50 and 52 to receive or supply electrical signals or power.

As best seen in FIGS. 1, 4, 5 and 6, the two flexible conductor-carrying tapes 40 and 54 pass from terminal strip 38 into the outer open end of a hollow stub shaft 60 secured to frame 10 in any appropriate manner, as by means of mating threads. Both tapes then pass outwardly through a slit 62 in the wall of hollow shaft 60 into an annular space between the outer cylindrical surface of shaft 60 and the inner cylindrical and coaxial surface 64 of a circular drum 66 mounted on outer gimbal 12. Ball bearing 67 serves to mount gimbal 12 on the outer surface of shaft 60 for rotation about the axis AA'.

As shown particularly clearly in FIG. 5, immediately after it passes through slit 62 tape 40 extends clockwise along the outer surface of shaft 60 and then extends between the outer surface of shaft 60 and the inner surface 64 of drum 66 in the form of a compressed resilient half loop 68, after which tape 40 continues counterclockwise around the inner surface 64 until it exits from drum 66 by way of a narrow axial slit 70. Tape 54 is arranged as a mirror image of the configuration of tape 40; it extends from slit 62 counterclockwise around the exterior of shaft 60, then in the form of a compressed resilient half loop 71 to the inner surface 64 of drum 66, along which it extends in a clockwise direction until it arrives at slit 70, through which it exits.

Referring again to FIG. 1, tape 40 then extend along outer gimbal 12 to terminal strip 76 therein, while tape 54 extends along outer gimbal 12 to terminal strip 78. Referring particularly to FIG. 7, terminal strip 76 consists of a plurality of contact pins such as 80 extending through, and insulatedly mounted on, an arcuate flange member 82 supported on outer gimbal 12. The end of tape 40 may have the form shown FIG. 11, being provided with a row of holes which slip over a corresponding row of contacts on the terminal strip 76. FIGS. 9 and 10 illustrate a typical contact pin arrangement. The flange member 82, which may be of metal in this example, is provided with holes in which are mounted insulating inserts such as 90 through the centers of which the contact pins such as 80 extend. The terminal holes in tape 40 are slipped over the pins 80, and bonding material such as solder is applied between the exposed conductive material 94 of the conductor in tape 40 and the contact pin 80. The opposite ends of the contact pins 80 are connected to the terminal ends of another similar tape 100, or individual conventional wires.

Tape 100 extends counterclockwise along the outer surface 101 of flange member 82 coaxially about axis BB', then extends in a compressed resilient half loop 102 to the inner surface 103 of another flange member 106 secured to the inner gimbal 18. Surface 103 confronts and is coaxial with the surface 101 of flange member 82. Tape member 100 then extends clockwise along the surface 103 and then makes contact to the contact pins such as 107 of a terminal strip 108 on flange member 106. The opposite ends of the contact pins 107 of terminal strip 108 are connected by suitable wires such as 109 (FIG. 2) to the control circuitry unit 32, these wires conveniently being carried in a common cable 110.

Similarly, tape 54 terminates at contact strip 78 on flange member 112, which is mounted on the outer gimbal 12 and is similar in form to flange member 82. Terminal strip 78 may be similar to terminal strip 76, and provides connection to one end of another tape 114, similar to tape 102, which passes along the outer surface 115 of flange member 112, coaxially about axis BB′ in a counterclockwise direction as seen in FIG. 8. Tape 114 then passes in a compressed resilient half loop 116 to the inner surface 117 of a flange member 118 secured to the inner gimbal 18; surface 117 confronts, and is coaxial with, surface 115. The terminal strip 120 on flange member 118 provides the desired electrical contact to the opposite end of tape 114, from which individual wires such as 121 may be supplied by way of cable 122 to the control circuitry unit 32.

The overall arrangement is then one in which electrical connection is provided between the contacts of the terminal strip 38 on the exterior of frame 10 and the control circuitry unit 32 on the inner gimbal 18 by way of tape 40, tape 100 and cable 122 on the one hand, and by way of tape 54, tape 114 and cable 122 on the other hand. It will be appreciated that the outer gimbal 12 is intended to be freely rotatable with respect to frame 10 about the axis AA′, and the inner gimbal 18 is intended to be freely rotatable about the axis BB′ with respect to outer gimbal 12. Accordingly the apparatus utilized to provide the electrical connections between outer gimbal 12 and both frame 10 and inner gimbal 18 should be of a type which will not introduce any appreciable forces or spring restraints of an unbalanced nature acting between outer gimbal 12 and either frame 10 or inner gimbal 18, since otherwise errors and inaccuracy will be produced into the operation of the gyroscope system. While in crude gyroscopes such interference or inaccuracy may be tolerated to a certain extent, in highly precise gyroscopes it is important that these forces or torques be reduced to a minimum, preferably by means of apparatus which is inexpensive and simple to employ. The arrangements shown in FIGS. 5 and 7 represent two possible ways of providing the desired electrical connection between the relatively rotating parts. In the case of FIG. 5, each of the two tapes 40 and 54 is continuous in passing across the bearing or pivot 16, while in the particular form shown in FIGS. 7 and 8, separate tapes 100 and 114 are used for bridging the space between the two relatively rotatable gimbals, contacts to the ends of tapes 100 and 114 being provided by terminal strips. However, it will be understood that the arrangements of FIGS. 7 and 8 may each employ a single continuous tape, without any terminal strips. The terminal strips 76, 78, 108, 120 merely provide connections for standard wiring to electrical elements on the two gimbals.

Referring now to the operation illustrated by FIGS. 5 and 6, FIG. 5 illustrates the condition existing when the frame 10 and the outer gimbal 12 are in the predetermined relative rotational position illustrated in FIGS. 1 and 2, while FIG. 6 illustrates the condition existing when the frame 10 has been rotated counterclockwise by an angle α with respect to gimbal 12. When the latter rotation occurs, the tape 40 unrolls slightly from the exterior of shaft 60 and onto the interior of drum 66 so that the position of the half loop 68 is moved counterclockwise; a similar but opposite effect occurs with respect to tape 54.

It is noted that the compression of the loops 68 and 71 is provided by a radial force at right angles to the outer surface of shaft 60 and the inner surface of drum 66, and that there is no sliding motion of either of the tapes, which instead are effectively rolled back and forth on the two confronting cylindrical surfaces. However, there is a slight remanent torque exerted by the tape 40 tending to rotate shaft 60 in a counterclockwise direction; this torque, however, is substantially completely balanced by the tendency of tape 54 to rotate shaft 60 in a clockwise direction. Accordingly, even when only one of the tapes is utilized to carry electrical current, the other one is preferably also used for its mechanical balancing effect.

In the arrangement of FIG. 7, the surfaces of the tape 100 adjacent the half loop 102 therein lie along portions of flange members 82 and 106 which are coaxial with the axis of rotation BB′ of the inner gimbal with respect to the outer gimbal. Accordingly, when the inner gimbal moves counterclockwise as viewed in FIG. 7, the loop will assume the extended position shown in the figure in broken line at 102A, and the resistance to such motion, from either frictional or spring restraint forces, is extremely small except for a small remanent torque which is balanced by the corresponding arrangement of tape 114 shown in FIG. 8. The latter tape arrangement is substantially identical with that in FIG. 7, but acts on the opposite side of the inner gimbal and in the opposite direction about axis BB′, so as to cancel out any remanent torque about BB′ produced by the tape 100. Accordingly, even if one or the other of the two tapes 100 and 114 is not utilized to carry electrical current, it is preferably used for its mechanical balancing effect.

As illustrated in FIG. 1, the tapes are ordinarily secured in place remote from the pivots or bearings by any appropriate clamping or retaining elements such as 180. In one preferred form of tape shown in FIG. 13, apertures such as 190 are provided through the tape at selected points along its center line where the tape is to be fastened to an adjacent support, and the printed wiring therein is fabricated so as to pass around the apertures as shown. A simple screw and washer may then be utilized to hold the tape in place, by inserting the screw through aperture 190 into a threaded recess in the adjacent support and tightening it down upon the tape.

FIGS. 14–16 illustrate an arrangement in which two tapes, one immediately above and in contact with the other, may be utilized to provide connection between two relatively movable bodies. FIG. 15 shows a gyroscope environment similar to that shown in FIG. 7, in which corresponding parts are designated by corresponding numerals with the suffix A. The flange member 82A is secured to an outer gimbal of a gyroscope and a flange member 106A is secured to the inner gimbal of a gyroscope, the relative rotational motion between the inner and outer gimbals being about the axis BB′. The outer surface of flange member 82A and the inner surface of flange member 106A again are coaxial with the axis BB′. In this case, however, it is assumed that two tapes 200 and 202 are utilized, one above the other, and connected at their ends to the contact pins of terminal strip 206 on flange member 82A. In this example it is assumed that there are twenty contact pins on terminal strip 206, arranged in two rows of ten each as shown in FIG. 14. The desired connection between pins of terminal strip 206 and those of terminal strip 208 on the inner-gimbal flange member 106A are provided by means of two tapes 210 and 212, which may be identical, tape 212 overlying tape 210. Tapes 210 and 212 are turned oppositely, as shown in FIG. 14, so that the terminal regions thereof extend laterally in opposite directions, the holes in one tape being aligned with one set of ten contacts and the holes in the other with the other set of ten contacts. Furthermore, the tapes 210 and 212 may be of the same length but shifted by one contact with respect to their connections to their respective terminals in the manner indicated in FIG. 14 for example. This displacement between the ends of the tapes causes a corresponding displacement between the loops 216 and 218 in tapes 210 and 212 respectively to permit free independent action of the two tapes in their rolling action on the two coaxial surfaces on the two relatively rotatable members. The shifted position of the two tapes on the two terminal strips is not necessary if instead the underlying tape 210 is made somewhat longer than the other tape 212. More than two tapes can be utilized in a general type of arrangement illustrated in FIG. 5, provided that the loops thereof are sufficiently displaced to provide free and independent action for each tape.

FIG. 17 illustrates an application of the invention in which, in effect, the radius of rotation is so great as to be considered infinite, in which case the two relatively movable members move translationally in parallel flat planes. Such form of the invention is useful, for example, in providing electrical connection between a machine bed and a relatively slidable machine head in a machine tool. For example, in FIG. 17 a machine bed 298 may be disposed adjacent a machine head 299 which is translatable with respect thereto in reciprocatory fashion in a horizontal plane along a direction indicated by the arrows in the figure. Two tapes 300 and 302 may extend from beneath the machine bed 298 through a slit 304 and thence along a horizontal upper surface 306 of the machine bed in opposite directions. Tape 300 is curved into an open loop 305 held compressed between surface 306 and the lower horizontal surface 310 of the machine head 299, along which surface it travels to slit 312, through which it exits. Tape 302 executes a similar path but in the opposite direction along surfaces 306 and 310. The broken lines in the figure show the positions of the tapes when the machine head 299 is moved to the left. While in ordinary machine applications the reduced force resulting from the electrical connection apparatus of the invention may not be significant in many applications, the invention nevertheless provides a form of connection which is very convenient, compact, inexpensive, easy to install and not subject to fatigue problems, and hence is advantageous even in such applications.

While in the examples shown the connection is provided by a flat tape, it will be understood that other forms of connectors having other cross-sectional shapes may be utilized, provided the coaxial surfaces along which they run are appropriately shaped to receive them in a smooth and uniform manner as they roll and unroll on the surfaces.

Thus while the invention has been described with particular reference to specific embodiments thereof in the interest of complete definiteness, it will be understood that it may be embodied in a variety of forms diverse from those specifically described without departing from the scope of the invention as defined by the appended claims.

I claim:

1. Apparatus for providing electrical connection between a point on a first body and a point on a second body movable with respect to said first body, comprising:
   a flexible member having a first portion fixed to said first body and a second portion fixed to said second body, said second portion being spaced along said member from said first portion, said member comprising an electrically-conductive material extending between said first and second portions thereof;
   a first surface on said first body and a second surface on said second body, said first and second surfaces being substantially parallel to each other;
   means for supporting said first and second bodies for relative movement such that said first and second surfaces move substantially parallel to each other;
   an intermediate portion of said member, between said first and second fixed portions thereof, extending between said first and second surfaces in an open resilient loop held under compression, but within its elastic limit, by said first and second surfaces, said intermediate portion also extending freely along and in contact with the parts of said first and second surfaces adjacent the opposite ends of said loop, the relative parallel movement between said first and second surfaces being along that dimension of said member which extends between said first and second portions thereof;
   another member similar to said flexible member in mechanical properties and form, a third surface on said first body, a fourth surface on said second body and substantially parallel to said third surface, said third and fourth surfaces being positioned so as to move substantially parallel to each other in response to said relative movement of said first and second bodies, said other member having a first portion fixed to said first body and a second portion fixed to said second body, the orientation of said loop in said other member being opposed to said loop of said flexible member with respect to the direction of said relative motion, whereby the lengths of said flexible member and of said other member lying along said first and third surfaces respectively change in opposite senses.

2. Apparatus for providing electrical connection between a gimbal of a gyroscope and another element of said gyroscope which is rotatable relative to said gimbal about a predetermined axis, comprising:
   a first circularly cylindrical surface on said gimbal, coaxial with said axis;
   a second circularly cylindrical surface on said element, coaxial with said axis and confronting said first surface;
   means for providing relative rotation of said element with respect to said gimbal, about said axis;
   a first flexible tape-like member having a first portion fixed with respect to said first surface and having a second portion fixed with respect to said second surface, said first and second portions being spaced along the length of said tape-like member by an intermediate portion thereof, said tape-like member comprising an electrical conductor extending between said first and second portions thereof;
   said intermediate portion of said tape-like member extending along said first surface in a first rotational sense about said axis, then across the space between said first and second surfaces in a compressed, resilient half-loop, and then along said second surface in a second rotational sense opposite to said first sense;
   a third circularly cylindrical surface on said gimbal, coaxial with said axis;
   a fourth circularly cylindrical surface on said relatively rotatable element, coaxial with said axis and confronting said third surface;
   a second flexible tape-like member having a first portion fixed with respect to said third surface and having a second portion fixed with respect to said fourth surface, said first and second portions thereof being spaced along the length of said second tape-like member by an intermediate portion thereof;
   said intermediate portion of said second tape-like member extending along said third surface in said second rotational sense about said axis, then across the space between said third and fourth surfaces in a compressed, resilient half-loop, and then along said fourth surface in said first rotational sense about said axis.

3. The apparatus of claim 2, in which said first and second tape-like members exert substantially equal but opposite torques between said gimbal and said other element, about said axis.

4. The apparatus of claim 2, in which said second tape-like member comprises another electrical conductor extending between said first and second portions thereof.

5. The apparatus of claim 2, in which said first and second surfaces and said first tape-like member are displaced along said axis from said third and fourth surfaces and said second tape-like member.

6. The apparatus of claim 2, in which said first and second surfaces and said first tape-like member are located at the same position along said axis as said third and fourth surfaces and said second tape-like member.

7. The apparatus of claim 6, in which said first and third surfaces have the same radius with respect to said axis and in which said second and fourth surfaces have the same radius with respect to said axis.

8. The apparatus of claim 2, in which said first and second tape-like members each comprise a tape member of plastic material having at least one filamentary electrical conductor embedded therein.

9. The apparatus of claim 2, comprising a third flexible tape-like member have a first portion fixed with respect to said first surface and a second portion fixed with respect to said second surface, said third tape-like member overlying said first tape-like member in surface contact therewith adjacent the ends of said resilient half-loop in said first tape-like member, and extending along the interior side of said last-named half-loop but spaced inwardly therefrom.

References Cited
UNITED STATES PATENTS

| | | | |
|---|---|---|---|
| 2,897,254 | 7/1959 | Dickinson | 339—17 X |
| 3,157,451 | 11/1964 | Martini | 339—17 X |
| 3,251,955 | 5/1966 | Erickson | 191—12 |
| 3,426,308 | 2/1969 | Anderson et al. | 339—5 |

RICHARD E. MOORE, Primary Examiner